Patented Sept. 5, 1922.

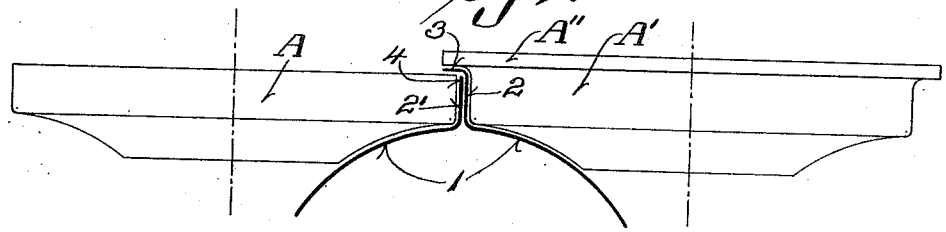
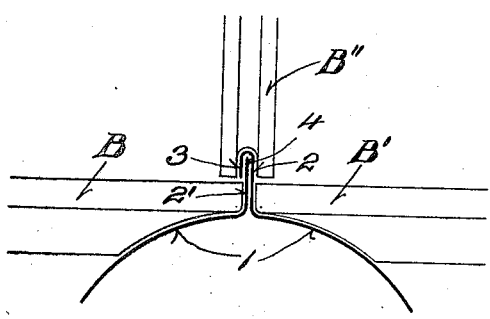
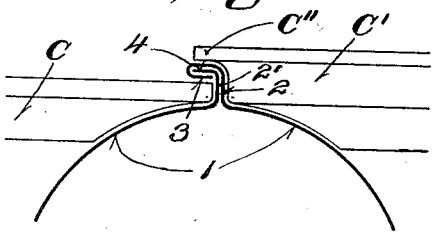
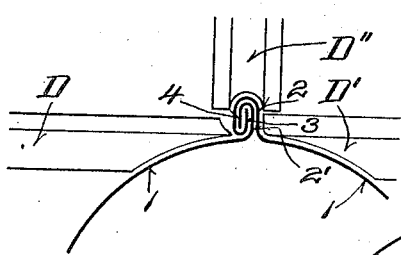
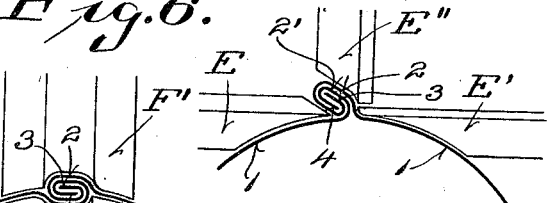
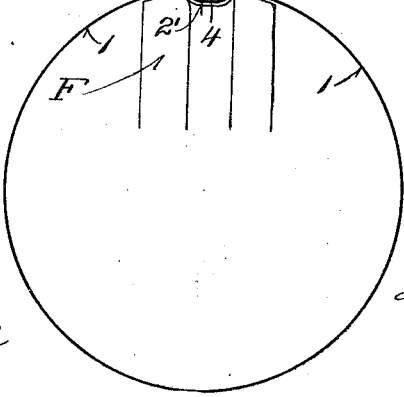

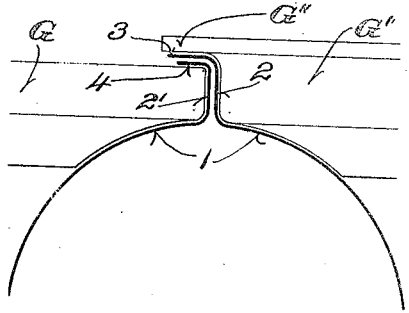
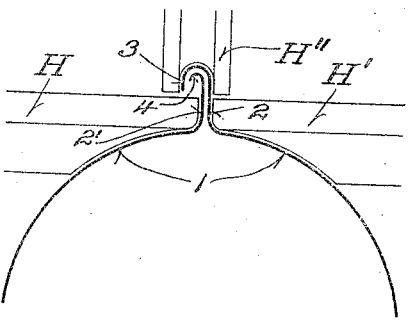
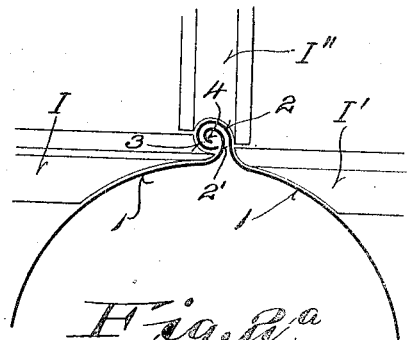
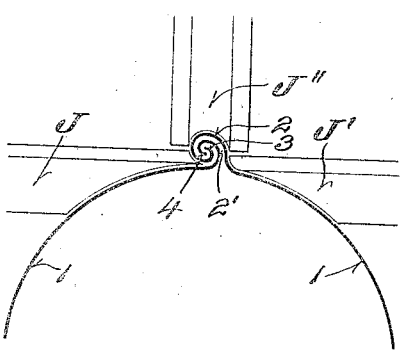
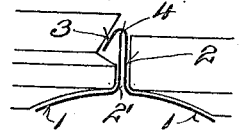
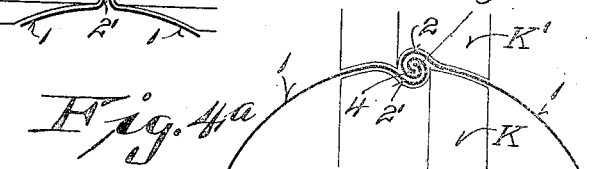
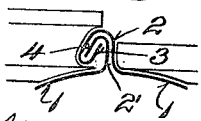

1,428,427

UNITED STATES PATENT OFFICE.

PHILLIPP F. FLAGGE, OF GREEN BAY, WISCONSIN, ASSIGNOR TO KLAUER MANUFACTURING COMPANY, OF DUBUQUE, IOWA, A CORPORATION OF IOWA.

PIPE CONSTRUCTION.

Application filed December 27, 1920. Serial No. 433,361.

*To all whom it may concern:*

Be it known that I, PHILLIPP F. FLAGGE, a citizen of the United States, and resident of Green Bay, in the county of Brown and State of Wisconsin, have invented certain new and useful Improvements in Pipe Constructions; and I do hereby declare that the following is a full, clear, and exact description thereof.

My invention refers to sheet metal conductor pipes and it has for its object to provide a simple, economical and durable seam for such pipes, and a method of forming the same whereby the pipe blank is continuously fed to sets of series of rolls, which gradually turn or fold the edges of the blank into what may be termed "a double locked seam." Applicant has had the advantage of a practical manufacturer in the art of conductor pipes and also the present methods used in manufacturing them.

Such pipes are ordinarily formed from flat blanks by simply folding the edges thereof throughout the length of the blank to produce what is known to the trade as a single seam unit. These blanks are thereafter bent up in tube form and brought together, so that their edges are interlocked throughout their length, by engagement of reverse U-shaped folds, which are thereafter pressed tightly together upon the body of the tube. In practice it has been found that such seams, in use, will frequently open and thereby cause leaky pipes, due to various climatic conditions, and furthermore, it has been found that the seams will contract and open up readily when compressed, incidentally to the ends being telescopically united with other pipe sections or elbows. This tendency to contract and open up by pressure in uniting the sections will obviously occur when it is borne in mind that the joint or seam is simply of the single type fold, and there is no resistance to this tendency to open, because the interlocked single seamed edges are in alignment with the pipe body, so that they will offer no resistance when the tendency of the pipe is to contract inwardly at its seamed portion.

My invention is primarily to overcome the above referred to objectionable features of standard conductor seams, and said invention primarily contemplates the provision of a series of sets of forming rolls arranged to receive a flat sheet metal blank, which is continuously fed thereto, whereby the blank is first shaped in tubular form, with radial meeting edges of different lengths adopted to come together, so that the various sets of forming rolls will progressively roll or fold the metal edges upon each other in the same direction, to ultimately produce a double locked seam that is flatly pressed into the body of the pipe, whereby liability of the seam to leak is avoided, and also the tendency to spring apart. This seam will obviously add rigidity and strength to the finished product.

With the above objects in view, the invention consists in certain peculiarities of construction and method, as hereinafter described, in connection with the accompanying illustrations and subsequently claimed.

In the drawings:

Figures 1 to 6 inclusive illustrate diagrammatically sets of rows arranged in series for forming the conductor continuously, as the blank travels through the various series of rolls from an approximate starting operation to a set of rolls, wherein the pipe seam is completed, and Figures 7 to 11 inclusive illustrate the same method of manufacturing the conductor pipes, in accordance with my invention, wherein the seam is rolled while the first mentioned series of rolls, as illustrated, in Figures 1 to 6 show the sets of rolls for folding the same.

In Figures 2ª and 4ª are illustrated tapered forms of rolls for accomplishing steps in the process illustrated in Figures 2 and 4. In Figures 2ª and 4ª the vertically disposed rolls are dispensed with.

Referring by characters to the drawings, 1 represents a fragment of a sheet metal blank, which is initially shaped to form a tube, having its meeting edges extended radially to form flat strips 2—2', the strip or edge 2 being of greater length than the edge 2'.

As the associated edge strips 2—2' travel between the forming rolls A—A', it will be noted that a flange A'' is adapted to engage the projecting edge portions 3 of the longer strip, whereby it is folded over its associated strip at a right angle. From this step in the formation of the seam, the edge strips pass through a second set of rolls B—B', as shown in Figure 2. The rolls B—B' in this instance are adapted to hold the base of the strips together, while the upper center grooved roll B″ acts directly upon the end portions 3 of strip 2 to fold the same downwardly over the shorter edge strip 2′.

Figure 3 illustrates the third set of folding rolls C—C′, the roll C′ being provided with a folding flange C″. As the partially completed seam travels between these rolls, it will be seen that the folded edge 3 of the longer strip, together with the upper portion 4 of the shorter strip, are now folded at a right angle to the base of the same. The seam is then subjected to pressure under a set of rolls D—D′—D″, the latter being centrally grooved whereby the end of the partly finished seam is given a quarter fold downwardly from the position assumed in Figure 3. Thus the parts are now nested in the form of an interlocking connection. The next operation as best shown in Figure 5 is to fold the entire nested seam body at an approximate angle of 45 degrees, with reference to the base thereof, and this is effected by the retaining rolls E—E′ operating in conjunction with a tapered base deflecting roll E″. The seam is then passed through a pair of grooved finishing rolls F—F′, as shown in Figure 6, whereby the juxtaposed walls of the tube are held while the nested elements, constituting the seam are flattened to assume a general position in alignment with the base walls. The seam, when completed, is in the form of a double lock, which lock cannot be separated without exerting sufficient physical force upon it to break the parts, and obviously it will resist leakage during the life of a metal stock and also add rigidity to it.

Figures 7 to 11 illustrate the method of forming the doubled locked seam by rolling in place of folding, and in Figure 7 of the drawings, the rolls G—G′ have faces which engage the base of the edge strips. The roll G′ is formed with a flange G″, which turns both the upper portion of both the long and short edge strips at a right angle to their base portions.

Figure 8 illustrates a set of three rolls H—H′—H″, the last named roll being grooved and adopted to further roll the ends of the strip edges downwardly in U-shape.

The next step in the formation of the seam, as shown, by Figure 9, is accomplished through a triple set of rolls I—I′—I″. All of these rolls have curved edges, whereby the material, as it passes through them, will be further crimped inwardly or rolled, the edges being gradually drawn inwardly, and in the next step of the formation, as shown in Figure 10, a set of rolls J—J′—J″ are employed, which are similar to the last mention set, with the exception that their curved surfaces are more closely related, whereby the roll of the seam is further contracted or tightened. The seam then passed through the final set of finishing rolls K—K′, as shown in Figure 11, whereby the side walls adjacent the roll seam are held, while said seam is finished or further compressed, so as to produce a practically water-tight interlocked double seam, which is in practice similar to the completed seam, as shown in Figure 6 of the drawings. Obviously, while I have described the blanks for forming the conductor pipes, as being continually fed to the sets of forming rolls arranged progressively in a suitable machine, in some instances the sets of roll series can be moved along the blank while the seam is held stationary.

Referring to Figures 2ᵃ and 4ᵃ, in some instances, I may dispense with the vertical rolls illustrated in Figures 2 and 4, and indicated by the reference numerals B″ and D″. In this case, the tapered fixed horizontally disposed rolls may be employed to angularly break down the folded edges 3 and 4, so as to bring the fold in a position to be completed.

I claim:

1. A method of forming metal conductor pipe sections consisting of continually feeding an initially flat blank to successively arranged sets of forming rolls, whereby the body of the blank is progressively shaped in tube formation having flat associated edge strips extending therefrom, and turning both of said edges in the same direction continuously until an interlocked double seam is produced.

2. A method of forming metal conductor pipe sections consisting of continually feeding an initially flat blank to successively arranged sets of forming rolls, whereby the body of the blank is progressively shaped in tube formation, having flat associated edge strips of different widths extending therefrom, the longer edge being folded downwardly upon the upper portion of the shorter edge strip, followed by again folding the interlocked edge strips downwardly upon the base portions of the same, and thereafter folding the entire nested edge strip portion downwardly upon the juxtaposed walls of the tube to produce a finished interlocked double-seam.

3. A method of forming metal conductor pipe sections consisting of continually feeding an initially flat blank to successively arranged sets of forming rolls, whereby the body of the blank is progressively shaped in tube formation having associated edge strips extending therefrom, and turning both of said edges in the same direction continuously until an interlocked double seam is produced.

4. The method of forming metal conductor pipe sections having a double interlocked seam, which method comprises continually feeding an initially flat blank to successively arranged sets of forming rolls, whereby the body of the blank is progressively shaped in tube formation having deflected edge strips extending therefrom, and continuously forming a double interlocking bend in each strip.

5. The method of forming metal conductor pipe sections having a double interlocked seam, which method comprises continually feeding an initially flat blank to successively arranged sets of forming rolls, whereby the body of the blank is progressively shaped in tube formation having deflected edge strips extending therefrom, and continuously folding each strip to form re-entrant interlocked portions.

In testimony that I claim the foregoing I have hereunto set my hand at Milwaukee, in the county of Milwaukee and State of Wisconsin.

PHILLIPP F. FLAGGE.